United States Patent
Bahr et al.

(10) Patent No.: US 10,340,769 B2
(45) Date of Patent: Jul. 2, 2019

(54) AUXILIARY DRIVE DEVICE

(71) Applicant: BorgWarner Inc., Auburn Hills, MI (US)

(72) Inventors: Alexander Bahr, Inzigkofen (DE); Thomas Buchholz, Stockach (DE)

(73) Assignee: BorgWarner Inc., Auburn Hills, MI (US)

( * ) Notice: Subject to any disclaimer, the term of this patent is extended or adjusted under 35 U.S.C. 154(b) by 352 days.

(21) Appl. No.: 15/264,663

(22) Filed: Sep. 14, 2016

(65) Prior Publication Data

US 2017/0077784 A1    Mar. 16, 2017

(30) Foreign Application Priority Data

Sep. 15, 2015  (DE) .................. 10 2015 217 615

(51) Int. Cl.
| | |
|---|---|
| *H02K 7/108* | (2006.01) |
| *H02K 7/14* | (2006.01) |
| *F16D 35/02* | (2006.01) |
| *F16D 48/02* | (2006.01) |

(52) U.S. Cl.
CPC ........... *H02K 7/108* (2013.01); *F16D 35/021* (2013.01); *F16D 35/024* (2013.01); *H02K 7/14* (2013.01); *F16D 2048/0245* (2013.01)

(58) Field of Classification Search
CPC .................. H02K 7/108; H02K 7/1085; F16D 25/00–39/00; F16D 2048/0245; F16D 2048/0248

See application file for complete search history.

(56) References Cited

U.S. PATENT DOCUMENTS

| | | | |
|---|---|---|---|
| 2,380,595 A | * | 7/1945 | Hertrich ..................... B04B 9/08 |
| | | | 192/103 B |
| 2012/0255714 A1 | | 10/2012 | Roby et al. |
| 2015/0034027 A1 | | 2/2015 | Buchholz et al. |
| 2016/0040676 A1 | | 2/2016 | Roby |

FOREIGN PATENT DOCUMENTS

WO    WO-2013119413 A1 *  8/2013  ........... F16D 35/028

\* cited by examiner

*Primary Examiner* — Ramon M Barrera
(74) *Attorney, Agent, or Firm* — Harness, Dickey & Pierce, P.L.C.

(57) ABSTRACT

The invention relates to an auxiliary drive device (1) comprising an electric motor (10, 11); and a mechanical clutch, wherein the electric motor (10, 11) and the mechanical clutch have the same axis of rotation (R), the mechanical clutch is designed as a fluid-friction clutch (20), and the electric motor (10, 11) and the fluid-friction clutch (20) are mechanically connected to one another.

3 Claims, 3 Drawing Sheets

AUXILIARY DRIVE DEVICE

CROSS-REFERENCE TO RELATED APPLICATIONS

This application claims the benefit of German Patent Application No. 102015217615.0 filed Sep. 15, 2015, the disclosure of which is herein incorporated by reference in its entirety.

DESCRIPTION

The invention relates to an auxiliary drive device according to the preamble of Claim 1.

The auxiliary drive device of this type is used, for example, in a motor vehicle comprising an internal combustion engine to drive a fan wheel and has for this purpose a fluid-friction clutch for the main fan wheel and a separate unit, which is an additional fan driven by an electric motor. The disadvantage of this auxiliary drive lies in the separation of the drive components, which substantially increases the number of components and the spatial requirements.

It is therefore the object of the present invention to create an auxiliary drive device of the type indicated in the preamble to Claim 1, which is more simply structured than in the known auxiliary drive devices and correspondingly enables a greater application range The solution to this problem is carried out by the features of Claim 1.

Thus, because the auxiliary drive device according to the invention combines a fluid-friction clutch with an electric motor, which are arranged around the same axis of rotation and are additionally mechanically coupled, the advantage results that the structure of the auxiliary drive device according to the invention is substantially more compact with respect to known devices and thus requires a smaller installation space. Further, a broader application range, energy savings, and new options for means of actuating the auxiliary drive device result. These actuating means comprise a drive, for example, of a fan wheel or of a pump wheel, [operated] exclusively via the fluid-friction clutch or exclusively via the electric motor. It is further possible to operate the electric motor and the fluid-friction clutch in combination, particularly if large losses are to be expected in the fluid-friction clutch.

The subclaims have advantageous refinements of the invention as content.

Figure 1:
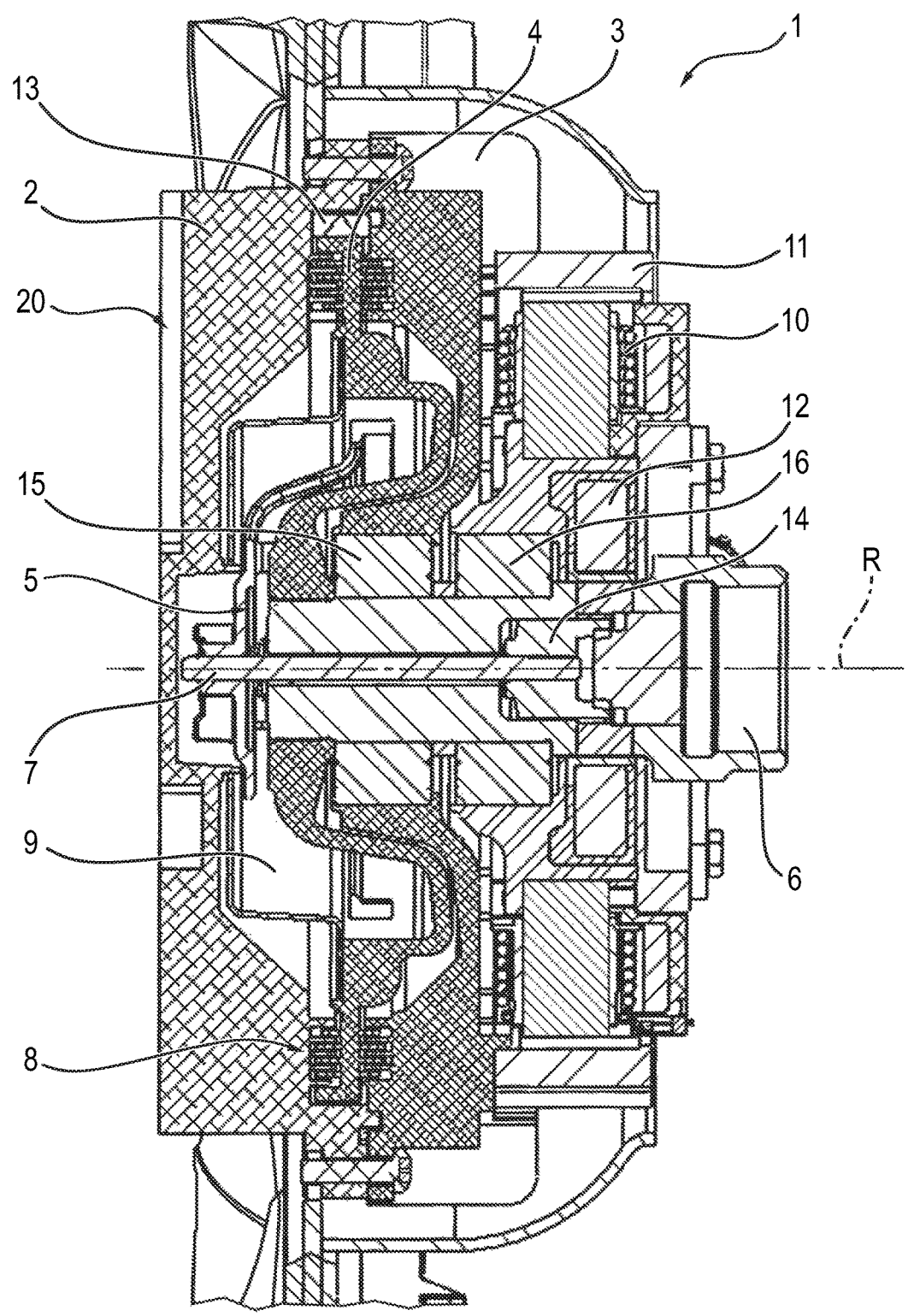
Figure 2:
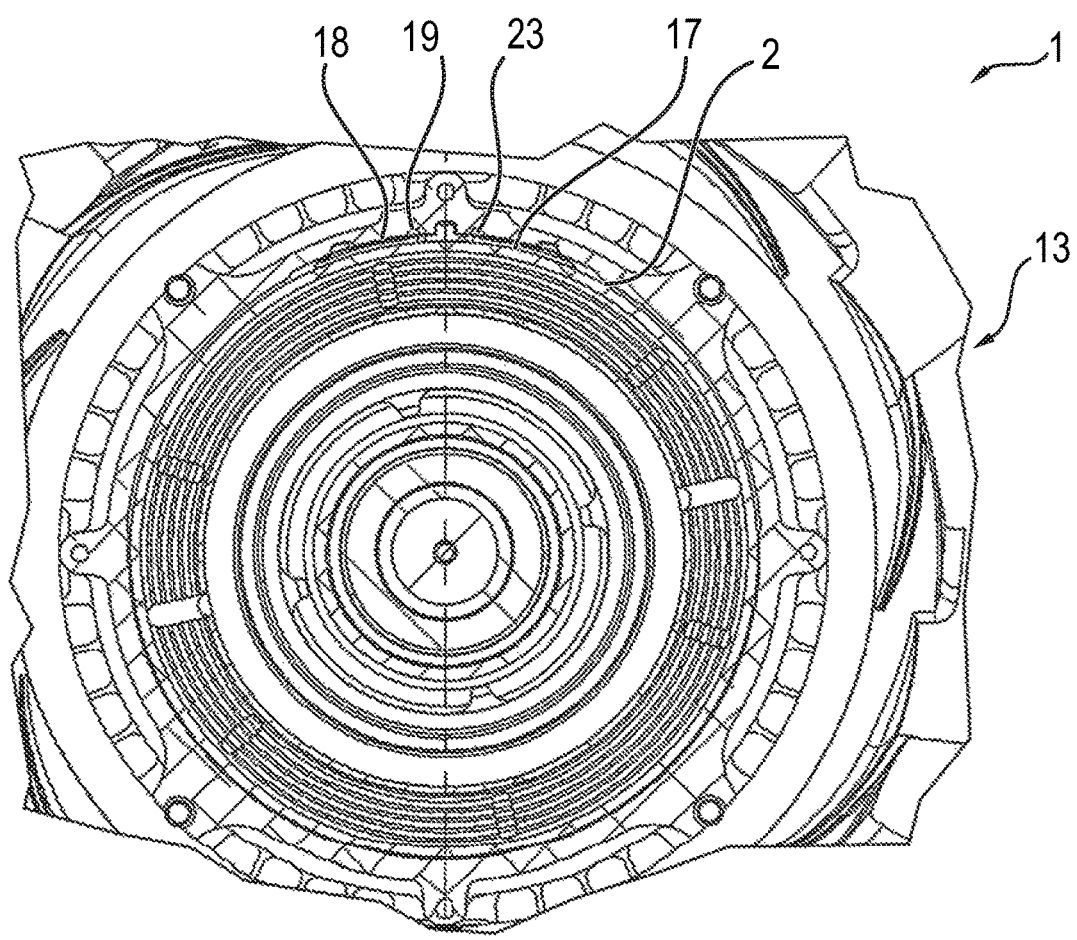
Figure 3:
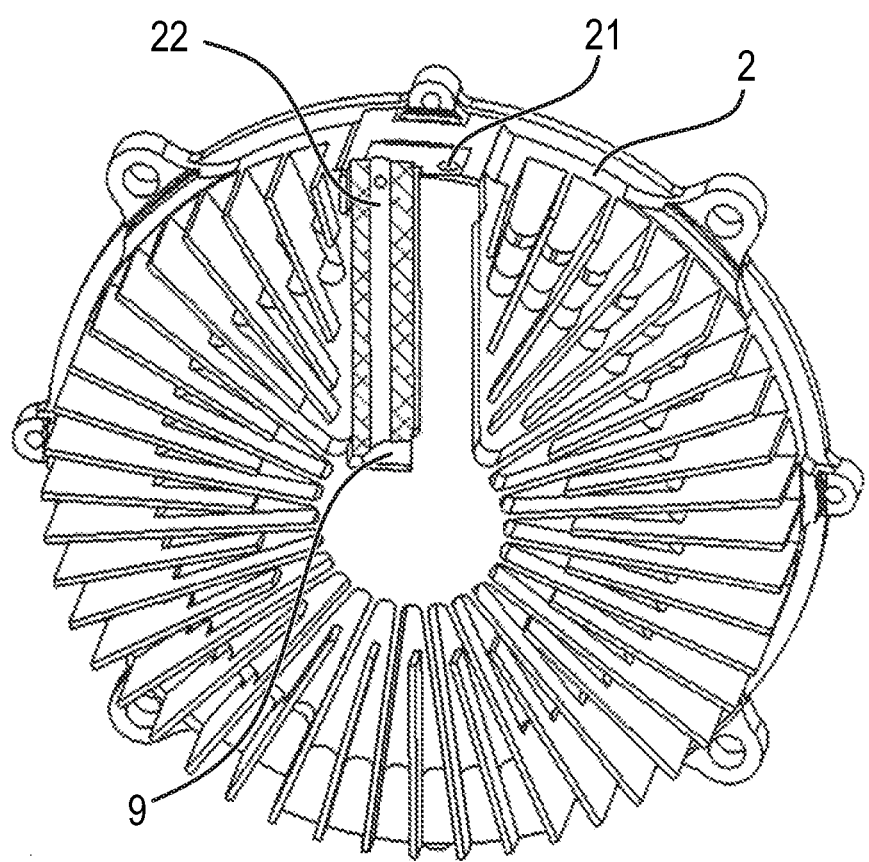

Additional details, features, and advantages of the present invention arise from the subsequent description of an embodiment with reference to the drawings:

FIG. 1 shows a schematically slightly simplified sectional view of an auxiliary drive device according to the invention, and FIGS. 2, 3 show in conjunction the depiction of a bidirectionally functioning drainage pump device in a top view and in a perspective view.

FIG. 1 clarifies an auxiliary drive device 1 according to the invention which comprises an axis of rotation R.

Auxiliary drive device 1 further has a fluid-friction clutch 20 which comprises a housing, which is usually composed from a housing cover 2 and a housing body 3.

A clutch disk 4 is arranged in housing 2, 3 and is fixed on an end of a shaft 6 which is mounted centrally in housing 2, 3 via bearing 15, 16.

Furthermore, fluid-friction clutch 20 of auxiliary drive device 1 according to the invention has a working chamber 8 between housing 2 and 3 and clutch disk 4.

Working chamber 8 has, as per usual, working gaps which enable, on the basis of a shear effect, a transmission of torque to clutch fluid supplied to working chamber 8.

Furthermore, a reservoir chamber 9 is provided for the clutch fluid and is connected to working chamber 8 via a feed channel and thereby forms the flow line.

The particularly preferred embodiment of auxiliary drive device 1 according to the invention depicted in FIG. 1 further has a valve mechanism 5 which is connected to an armature 14 via a tappet 7 arranged in the center of housing 2, 3.

As further components, auxiliary drive device 1 according to the invention has an electric motor, which has the same axis of rotation R as fluid-friction clutch 20 or is arranged concentrically like fluid-friction clutch 20 around drive shaft 6.

This electric motor comprises a rotor 11 which is connected rotationally fixed to housing part 3 and thus has a mechanical connection to the secondary side of fluid-friction clutch 20. The electric motor has, in addition to rotor 11, a stator 10 arranged within rotor 11 and a coil 12.

Using this arrangement, an extremely compact structure, as already explained in the beginning, is to be realized, and it is additionally possible to operate the electric motor and fluid-friction clutch 20 respectively alone or also to carry out a combined operating method, in particular, if large losses are to be expected in fluid-friction clutch 20.

Auxiliary drive device 1 according to the invention may interact with a plurality of functional elements, such as, in particular, fan wheels or pump wheels. Furthermore, auxiliary drive device 1 or fluid-friction clutch 20 thereof may interact via a suitable connection, such as, for example, a belt drive, with a drive motor, in particular, an internal combustion engine in a motor vehicle, not shown in more detail in FIG. 1.

As a special feature, auxiliary drive device 1 according to the invention furthermore has a bidirectionally functional drainage pump device 13. This drainage pump device 13 is designed to be bidirectional as, in certain operating states, the electric motor may drive fluid-friction clutch 20, which is normally reversed as the secondary rotational speed is lower than the primary rotational speed which, as previously explained, may, however, also be reversed in auxiliary drive device 1 according to the invention.

Correspondingly, drainage pump device 13 has the components visible in FIGS. 2 and 3. In this case, this includes two drainage pumping elements 17, 18, which are visible in FIG. 2 and integrated into housing part 2 and connected rotationally fixed with the same. As FIG. 2 clarifies, drainage pumping elements 17 and 18 hereby contact one another back to back and interact with two drainage openings 19 and 23 which, as clarified in FIG. 3, are in fluidic connection with drainage pump channels 21 and 22, which in turn may lead to reservoir chamber 9 and may drain clutch fluid into the same.

In addition to the previous written disclosure of the invention, reference is explicitly made here to the graphic depiction of the invention in FIGS. 1 through 3 as supplemental to this disclosure.

LIST OF REFERENCE NUMERALS

1 Auxiliary drive device
2, 3 Housing/housing components
4 Clutch disk
5 Valve mechanism
6 Drive shaft 7 Tappet
8 Working chamber
9 Reservoir chamber (arranged radially inward, thus closer to axis of rotation R than the working chamber 8)
10 Stator
11 Rotor
12 Coil
13 Drainage pump device
14 Armature
15, 16 Bearing
17, 18 Drainage pumping elements
19, 23 Drainage openings
20 Fluid-friction clutch
21, 22 Drainage channels

The invention claimed is:

1. An auxiliary drive device comprising
an electric motor having a rotor, which is rotatable about an axis, and a stator that is received within the rotor; and
a viscous clutch having a housing, a clutch disk and a reservoir, the housing being coupled to the rotor for common rotation about the axis, the clutch disk being received in the housing and being rotatable about the axis relative to the housing, the housing and the clutch disk forming a working chamber, the reservoir being coupled in fluid communication to the working chamber.

2. The auxiliary drive of claim 1, wherein the fluid-friction clutch includes a bidirectionally functioning drainage pump that fluidly couples a radially outward end of the working chamber to the reservoir.

3. The auxiliary drive of claim 2, wherein the drainage pump includes two drainage pumping elements that are incorporated into the housing opposite one another, the drainage pumping elements being coupled to the housing and being in fluidic connection with assigned drainage pump channels, the drainage pump channels extending toward the reservoir.

* * * * *